(12) United States Patent
Wang et al.

(10) Patent No.: US 12,355,139 B2
(45) Date of Patent: Jul. 8, 2025

(54) ELECTRONIC COMPONENT CONNECTING STRUCTURE AND ELECTRONIC DEVICE

(71) Applicant: HONOR DEVICE CO., LTD., Shenzhen (CN)

(72) Inventors: Yan Wang, Shenzhen (CN); Jiuliang Gao, Shenzhen (CN); Yan Lv, Shenzhen (CN); Yunchun Huang, Shenzhen (CN); Sen Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 17 days.

(21) Appl. No.: 17/779,297

(22) PCT Filed: Jan. 14, 2022

(86) PCT No.: PCT/CN2022/072165
§ 371 (c)(1),
(2) Date: May 24, 2022

(87) PCT Pub. No.: WO2022/227718
PCT Pub. Date: Nov. 3, 2022

(65) Prior Publication Data
US 2024/0170830 A1  May 23, 2024

(30) Foreign Application Priority Data

Apr. 30, 2021 (CN) .......................... 202120944650.7
Jun. 16, 2021 (CN) .......................... 202121343155.7

(51) Int. Cl.
*H01Q 1/24* (2006.01)
*H01Q 1/38* (2006.01)
(Continued)

(52) U.S. Cl.
CPC ............... *H01Q 1/243* (2013.01); *H01Q 1/38* (2013.01); *H01Q 1/52* (2013.01); *H04B 1/3816* (2013.01)

(58) Field of Classification Search
CPC ............. H01Q 1/243; H01Q 1/38; H01Q 1/52
See application file for complete search history.

(56) References Cited

U.S. PATENT DOCUMENTS

| 4,682,180 A | 7/1987 | Gans |
| 11,929,543 B2 | 3/2024 | Zhang et al. |

(Continued)

FOREIGN PATENT DOCUMENTS

| CN | 102789590 A | 11/2012 |
| CN | 202838355 U | 3/2013 |

(Continued)

OTHER PUBLICATIONS

Suovanen Jeff et al.: "Samsung Galaxy S7 Teardown", Mar. 11, 2016, pp. 1-32.
(Continued)

*Primary Examiner* — Graham P Smith
(74) *Attorney, Agent, or Firm* — WOMBLE BOND DICKINSON (US) LLP (57) ABSTRACT

An connecting structure includes a connecting board, a first component connecting to one side of the connecting board; and a second component connecting to the other side of the connecting board. A perpendicular projection of the first component on a preset plane overlaps a perpendicular projection of the second component on the preset plane, and the preset plane is parallel to a plane on which one side of the connecting board is located. A padding element is disposed between the first component and the connecting board. The (Continued)

structure can reduce occupation of transverse space inside the electronic device and help make a profile of the electronic device smaller.

20 Claims, 9 Drawing Sheets

(51) Int. Cl.
*H01Q 1/52* (2006.01)
*H04B 1/3816* (2015.01)

(56) References Cited

U.S. PATENT DOCUMENTS

| | | | |
|---|---|---|---|
| 2014/0078018 | A1 | 3/2014 | Wong et al. |
| 2018/0076526 | A1* | 3/2018 | Garcia ................ H01Q 19/30 |
| 2019/0128937 | A1 | 5/2019 | Choi et al. |
| 2020/0053894 | A1 | 2/2020 | Huang |
| 2020/0186180 | A1 | 6/2020 | Park et al. |
| 2020/0335850 | A1 | 10/2020 | Oh et al. |

FOREIGN PATENT DOCUMENTS

| | | |
|---|---|---|
| CN | 203086534 U | 7/2013 |
| CN | 103762411 A | 4/2014 |
| CN | 204155964 U | 2/2015 |
| CN | 107454215 A | 12/2017 |
| CN | 207020704 U | 2/2018 |
| CN | 207022058 U | 2/2018 |
| CN | 107948355 A | 4/2018 |
| CN | 110061038 A | 7/2019 |
| CN | 110635234 A | 12/2019 |
| CN | 111836507 A | 10/2020 |
| CN | 211791724 U | 10/2020 |
| TW | I243641 B | 11/2005 |
| TW | M331816 U | 5/2008 |
| WO | 2016046184 A1 | 3/2016 |
| WO | 2020082361 A1 | 4/2020 |

OTHER PUBLICATIONS

Suovanen Jeff et al.: "Samsung Galaxy S7 Teardown—Step 13—detailed view", Mar. 11, 2016, pp. 1-2.
Noronha Evan et al.: "Samsung Galaxy S6 Edge Teardown", Apr. 10, 2015, pp. 1-26.
Noronha Evan et al.: "Samsung Galaxy S6 Edge Teardown—Step 12—detailed view", Apr. 10, 2015, pp. 1-2.
Hodson David et al.: "Samsung Galaxy S4 Teardown", Apr. 27, 2013, pp. 1-30.
Ding Mingshi et al.: "Design of a Telecardiology Monitoring Terminal Based on Mobile Communication", Journal of Tianjin University. 2004(12), Dec. 25, 2004, 6 pages.

* cited by examiner

ELECTRONIC COMPONENT CONNECTING STRUCTURE AND ELECTRONIC DEVICE

CROSS-REFERENCE TO RELATED APPLICATIONS

This application is a National Stage of International Application No. PCT/CN2022/072165, filed on Jan. 14, 2022, which claims priority to Chinese Patent Application No. 202120944650.7, filed on Apr. 30, 2021, and Chinese Patent Application No. 202121343155.7, filed on Jun. 16, 2021. The disclosures of which are incorporated herein by reference in their entireties.

TECHNICAL FIELD

This application relates to the field of electrical connecting structures, and in particular, to an electronic component connecting structure and an electronic device.

BACKGROUND

With the development of science and technology, people are having increasingly high demands on mobility and portability of electronic devices, and the profile size of electronic devices is one of important factors affecting their portability.

To implement different functions of an electronic device, a plurality of electronic components (for example, an antenna elastic sheet) are usually installed. With an antenna elastic sheet installed in the electronic device, other components are usually connected to a circuit board on which the antenna elastic sheet is installed. To avoid mutual interference between the antenna elastic sheet and the other components, a specific avoidance space is usually provided between the antenna elastic sheet and the other components. However, a manner of providing an avoidance space in the prior art requires occupation of a relatively large space, as a result of which internal layout of the electronic device is not compact enough to reduce a size of the electronic device.

SUMMARY

Embodiments of this application provide an electronic component connecting structure and an electronic device, which can reduce space occupied by a connecting structure in a transverse direction, thereby reducing occupation of transverse space inside an electronic device and helping make a profile of the electronic device smaller.

To achieve the foregoing objectives, the following technical solutions are used in this application.

According to a first aspect, an electronic component connecting structure is provided, including a connecting board, a first component, and a second component, where the first component is connected to one side of the connecting board, and the second component is connected to the other side of the connecting board. A perpendicular projection of the first component on a preset plane overlaps a perpendicular projection of the second component on the preset plane, or a distance between the perpendicular projection of the first component on the preset plane and the perpendicular projection of the second component on the preset plane is less than a threshold distance, and the preset plane is parallel to a plane on which one side of the connecting board is located. A distance between the first component and the second component is greater than or equal to the threshold distance.

The threshold distance is the minimum distance to prevent mutual interference between the first component and the second component.

On that basis, spaces on two sides of the connecting board are fully utilized by disposing the first component and the second component on both sides of the connecting board. The distance between the perpendicular projection of the first component on the preset plane and the perpendicular projection of the second component on the preset plane is less than the threshold distance, so that a distance between the first component and the second component in a transverse direction is less than the threshold distance, thereby reducing the occupation of transverse space. The distance between the first component and the second component is greater than or equal to the threshold distance, avoiding mutual interference between the first component and the second component.

When the connecting board is being disposed, a thickness direction of the connecting board is usually consistent with a thickness direction of the electronic device, that is, a space of the electronic device in the thickness direction becomes part or all of an avoidance space between the first component and the second component, so as to avoid using only the transverse space inside the electronic device as the avoidance space. This reduces the occupation of transverse space inside the electronic device and helps make a profile of the electronic device smaller.

On that basis, the first component and the second component are disposed on both sides of the connecting board, and the perpendicular projection of the first component on the preset plane overlaps the perpendicular projection of the second component on the preset plane. To be specific, the first component and the second component are disposed in corresponding positions on both sides of the connecting board, and the distance between the first component and the second component is greater than or equal to a preset threshold distance. In this way, the mutual interference between the first component and the second component is avoided, and the spaces on both sides of the connecting board are used as avoidance spaces between the first component and the second component, thereby reducing the occupation of transverse space. When the connecting board is being disposed, the thickness direction of the connecting board is usually consistent with the thickness direction of the electronic device, so that the avoidance space between the first component and the second component is the space of the electronic device in the thickness direction. This avoids occupation of transverse space inside the electronic device and helps make a profile of the electronic device smaller.

With reference to the first aspect, in a possible design manner, the perpendicular projection of the first component on the preset plane overlaps the perpendicular projection of the second component on the preset plane, and a distance between the first component and the second component in a direction perpendicular to the preset plane is greater than or equal to the threshold distance.

On that basis, the perpendicular projection of the first component on the preset plane overlaps the perpendicular projection of the second component on the preset plane, and the first component and the second component are located in corresponding positions on both sides of the connecting board, that is, there is basically no transverse avoidance space between the first component and the second component, and a longitudinal space is used as the avoidance space. The distance between the first component and the second component in the direction perpendicular to the preset plane is greater than or equal to the threshold distance, to avoid the mutual interference between the first component and the second component.

With reference to the first aspect, in a possible design manner, a padding element is disposed between the first component and the connecting board.

On that basis, the padding element is disposed, so that the distance between the first component and the second component is greater than or equal to the preset threshold distance. Cost of the padding element is relatively low, and the padding element may also be an element on the connecting board, to reduce the cost while avoiding the mutual interference between the first component and the second component.

With reference to the first aspect, in a possible design manner, the connecting board includes a first connecting sub-board and a second connecting sub-board, the first component is connected to a first side of the first connecting sub-board, and the second component is connected to a second side of the second connecting sub-board. A second side of the first connecting sub-board is connected to a first side of the second connecting sub-board, and the first connecting sub-board has a smaller area than the second connecting sub-board. The first side of the first connecting sub-board is opposite the second side of the first connecting sub-board, and the first side of the second connecting sub-board is opposite the second side of the second connecting sub-board.

On that basis, two connecting sub-boards are disposed to form the connecting board, the first connecting sub-board is stacked with the second connecting sub-board, and a position at which the sub-boards are stacked can increase a thickness of the connecting board. This type of connecting board has a simple process and relatively low manufacturing cost. The first component and the second component are disposed on the first connecting sub-board and the second connecting sub-board, respectively, so that the first component and the second component are located on both sides of the connecting board, at which positions the thickness of the connecting board is greater. This helps increase the distance between the first component and the second component, to meet the threshold distance, prevent the mutual interference between the first component and the second component, and reduce the transverse space occupied by the first component and the second component.

With reference to the first aspect, in a possible design manner, the first component is connected to the first connecting sub-board, and a distance between the first component and the second connecting sub-board in the direction perpendicular to the preset plane is greater than or equal to a preset distance.

On that basis, the first component is disposed in the first connecting sub-board. Such design manner provides a specific connecting method of the first component. A safety gap is provided between the first component and the second connecting sub-board, which can prevent mutual interference between the first component and a component and a circuit on the second connecting sub-board.

With reference to the first aspect, in a possible design manner, a protrusion is disposed on one side of the connecting board, and the first component is connected to the protrusion.

On that basis, the protrusion is provided, so that a thickness of part of the connecting board is increased. The first component and the second component are respectively disposed on the protrusion and the other side of the connecting board corresponding to the protrusion, so that the distance between the first component and the second component can meet the threshold distance, to avoid the mutual interference between the first component and the second component and form the avoidance space between the first component and the second component in a longitudinal direction, thereby reducing the occupation of transverse space.

With reference to the first aspect, in a possible design manner, the padding element is welded to the connecting board. Connection stability between the padding element and the connecting board can be improved by welding the padding element to the connecting board.

With reference to the first aspect, in a possible design manner, the first component and the connecting board are packaged using DIP.

With reference to the first aspect, in a possible design manner, the padding element is a capacitor, a resistor, or a pad.

With reference to the first aspect, in a possible design manner, the first connecting sub-board is connected to the second connecting sub-board through welding.

With reference to the first aspect, in a possible design manner, a thickness of the first connecting sub-board is 0.4 mm to 1.0 mm, and a thickness of the second connecting sub-board is 0.4 mm to 1.0 mm.

On that basis, the foregoing design manner provides a specific implementation of the first connecting sub-board and the second connecting sub-board.

With reference to the first aspect, in a possible design manner, the first component is an antenna elastic sheet, the second component is a SIM card tray, and the connecting board is a PCB board.

With reference to the first aspect, in a possible design manner, the perpendicular projection of the first component on the preset plane partially overlaps or does not overlap the perpendicular projection of the second component on the preset plane, and the distance between the first component and the second component is greater than or equal to the threshold distance.

On that basis, in this embodiment, part of the transverse space and part of the longitudinal space jointly form an avoidance space between the first component and the second component, so that the distance between the first component and the second component is not less than the threshold distance. This manner effectively reduces the transverse space occupied by the first component and the second component, compared with a manner in which only the transverse space is used as the avoidance space between the first component and the second component, reducing the occupation of transverse space inside the electronic device and helping make a profile of the electronic device smaller.

According to a second aspect, this application provides an electronic device, including a housing and the electronic component connecting structure described in any one of the first aspect or the possible design manners of the first aspect, where the electronic component connecting structure is connected to the housing.

According to a third aspect, an electronic device is provided. The electronic device includes the electronic component connecting structure described in any one of the first aspect or the possible design manners of the first aspect, where the first component is an antenna elastic sheet, the second component is a SIM card tray, and a first connecting board and a second connecting board are disposed between the antenna elastic sheet and the SIM card tray, where the connecting board includes the first connecting board and the second connecting board, the antenna elastic sheet is connected to the first connecting board, the SIM card tray is connected to the second connecting board, and the first connecting board is connected to the second connecting board.

With reference to the third aspect, in a possible design manner, a perpendicular projection of the antenna elastic sheet on the first connecting board overlaps a perpendicular projection of the SIM card tray on the first connecting board, or a perpendicular projection of the antenna elastic sheet on the second connecting board overlaps a perpendicular projection of the SIM card tray on the second connecting board.

According to a fourth aspect, an electronic device is provided. The electronic device includes the electronic component connecting structure described in any one of the first aspect or the possible design manners of the first aspect, where the first component is an antenna elastic sheet, the second component is a SIM card tray, and the connecting board is disposed between the antenna elastic sheet and the SIM card tray, where the antenna elastic sheet and the SIM card tray are respectively connected on two sides of the connecting board, and a padding element is further disposed between the antenna elastic sheet and the connecting board.

With reference to the fourth aspect, in a possible design manner, a perpendicular projection of the antenna elastic sheet on the connecting board overlaps a perpendicular projection of the SIM card tray on the connecting board.

DETAILED DESCRIPTION OF EMBODIMENTS

The following describes technical solutions of this application with reference to accompanying drawings.

In the embodiments of this application, words such as "illustrative" and "for example" are used to represent an example, an instance, or an illustration. Any embodiment or design solution described by "illustrative" or "for example" in the embodiments of this application shall not be construed as being more preferential or advantageous than other embodiments or design solutions. To be precise, words such as "illustrative" and "for example" are intended to present a related concept in a specific manner.

In the embodiments of this application, the terms "first" and "second" are merely intended for a purpose of description, and shall not be understood as an indication or implication of relative importance or an implicit indication of a quantity of the indicated technical features. Therefore, a feature defined by "first" or "second" may explicitly or implicitly include one or more features.

It should be understood that the terms used in the descriptions of the various examples in the specification are merely intended to describe specific examples, but are not intended to limit this application. As used in the descriptions of the various examples, unless otherwise clearly stated in the context, singular forms defined by "one ("a" and "an")" and "the" are intended to also include plural forms.

In this application, "at least one" means one or more, and "a plurality of" means two or more. "At least one of the following items (objects)" or a similar expression means any combination of these items, including a single item (object) or any combination of a plurality of items (objects). For example, at least one item (object) of a, b, or c may represent: a, b, c, a and b, a and c, b and c, or a, b and c, where a, b, and c may be singular or plural.

It should be further understood that the term "and/or" as used in the specification refers to and intends to cover any and all possible combinations of one or more of the associated listed items. The term "and/or" describes an association relationship for describing associated objects and represents that three relationships may be present. For example, A and/or B may represent the following three cases: presence of only A, both A and B, and only B. In addition, the character "/" in this application generally indicates an "or" relationship between the associated objects.

It should be further understood that in this application, unless otherwise specified and defined explicitly, the term "connection" should be understood in its general sense. For example, "connection" may be a fixed connection, a slidable connection, a detachable connection, or an integral piece; and may be a direct connection or an indirect connection through an intermediate medium.

It should be further understood that when used in this specification, the term "comprise/include" (also "includes", "including", "comprises", and/or "comprising") is used to specify that the stated features, integers, steps, operations, elements, and/or components are present, but does not preclude presence or addition of one or more other features, integers, steps, operations, elements, components, and/or groupings thereof.

It should be understood that references to the terms "an embodiment", "another embodiment", and "a possible design" throughout the specification mean that specified features, structures, or characteristics related to the embodiments or the implementations are included in at least one embodiment of this application. Therefore, "in an embodiment of this application", "in another embodiment of this application", and "a possible design method" appearing throughout the specification do not necessarily refer to a same embodiment. In addition, these specified features, structures, or characteristics may be combined in one or more embodiments in any suitable manner.

Figure 1:
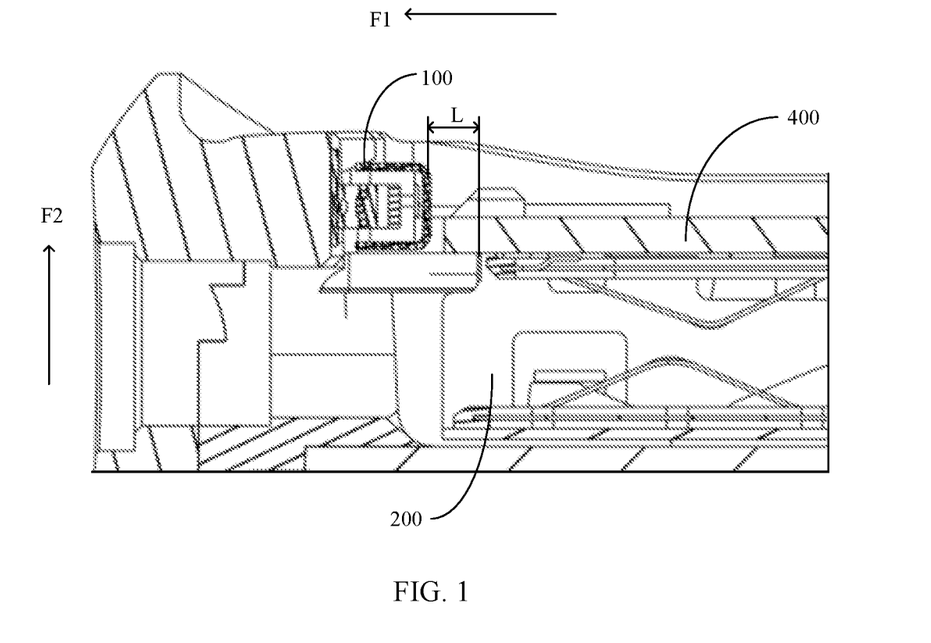
FIG. 1 is a schematic diagram of an electronic component connecting structure in the prior art.

FIG. 1 is a schematic connection diagram of an electronic component connecting structure in the prior art. As shown in FIG. 1, a direction indicated by F1 in the figure is a transverse direction, and the transverse direction also includes a direction opposite to the direction indicated by F1. A direction indicated by F2 is a longitudinal direction, and the longitudinal direction also includes a direction opposite to the direction indicated by F2. Taking an electronic component connecting structure located in a mobile phone for example, in a three-dimensional coordinate system (x, y, z), if a plane on which a screen of the mobile phone is located is an xy plane, the transverse direction may be a direction of an x-axis, a direction of a y-axis, or a direction of any other straight line on the xy plane, which specifically needs to be determined based on a placement position of the mobile phone and an arrangement direction of the electronic component connecting structure in the mobile phone, and may be determined with reference to the F1 direction shown in FIG. 1. If the plane on which the screen of the mobile phone is located is the xy plane, the longitudinal direction is a direction of a z-axis.

A transverse space in the embodiments of this application is a distance between a first component and a second component in the transverse direction, and a longitudinal space is a distance between the first component and the second component in the longitudinal direction. A first component 100 is fixedly installed on an installation board 400, and a second component 200 is also fixedly installed on the installation board 400. The installation board 400 is fastened in a housing of an electronic device or fastened on a supporting member inside the electronic device. The first component 100 and the second component 200 are respectively fastened at different positions on the installation board 400, so that a specific distance is maintained between the first component 100 and the second component 200 in the F1 direction.

Figure 2:
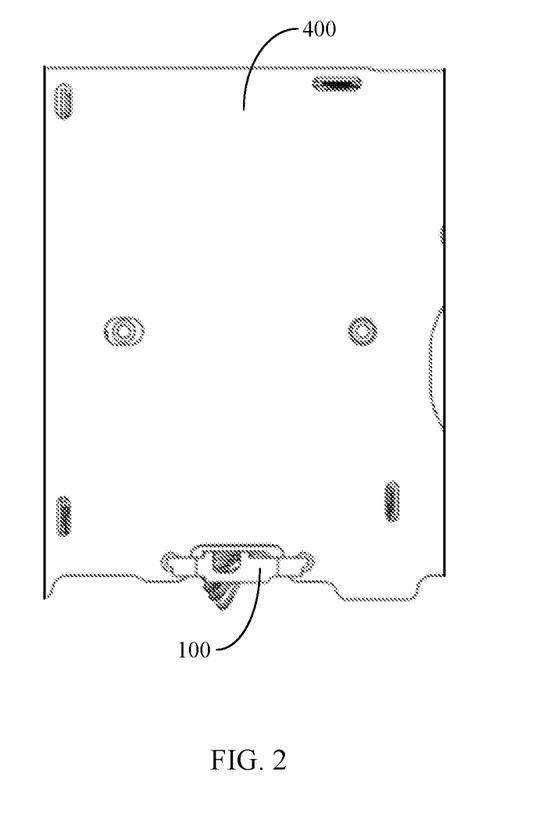
FIG. 2 is a schematic diagram of a first component installed on an installation board in the prior art.
Figure 3:
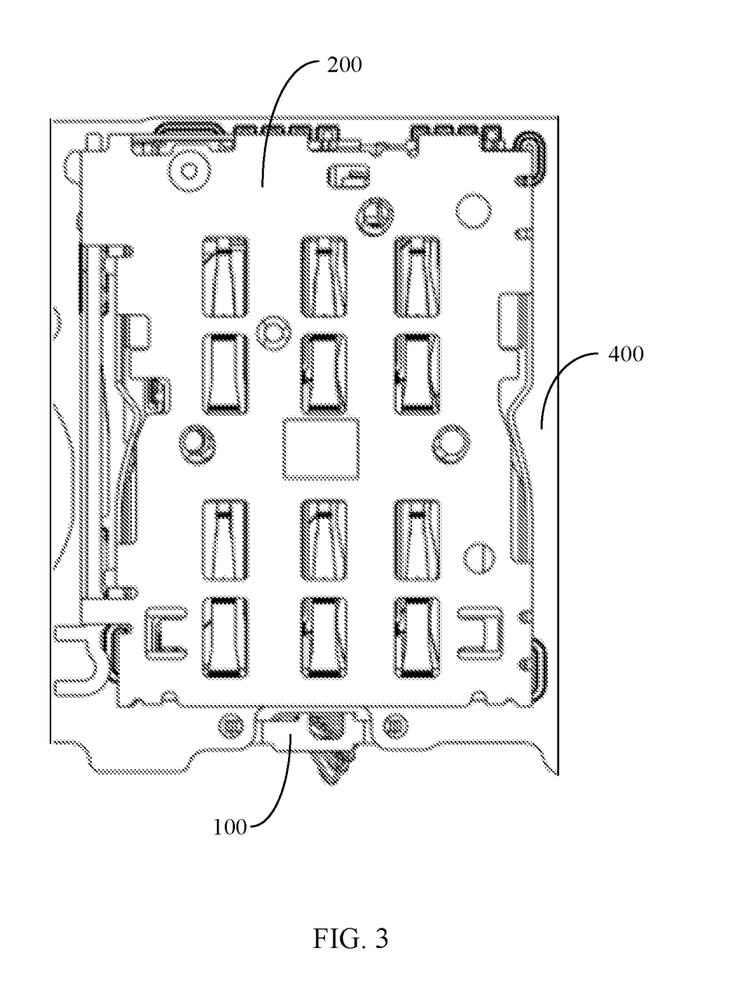
FIG. 3 is a top view of an electronic component connecting structure in the prior art.

FIG. 2 is a schematic diagram of the first component 100 on the installation board 400. The first component 100 is fastened on the installation board 400 and communicates with a circuit on the installation board 400. The installation board 400 may be a PCB or other types of boards. FIG. 3 is a top view of an electronic component connecting structure in the prior art, and shows a relative position between the first component 100 and the second component 200. As shown in FIG. 3, taking a plane parallel to a plane on any side of the installation board 400 as a reference plane, a projection of the first component 100 on the reference plane and a projection of the second component 200 on the reference plane do not coincide. With reference to FIG. 1, that means the first component 100 and the second component 200 do not coincide in the longitudinal direction (F2 direction).

As shown in FIG. 1, L in FIG. 1 is a distance between the first component 100 and the second component 200 in the figure. When the first component 100 and the second component 200 correspond to a specific component, for example, an antenna elastic sheet, a subscriber identity module (Subscriber Identity Module, SIM) card tray, a microphone, a speaker, a motor, a camera, or a receiver, due to different positions of interfering sources in the components, in this embodiment, the distance between the first component 100 and the second component 200 may be a minimum linear distance between the first component 100 itself and the second component 200 itself. Certainly, the distance between the first component 100 and the second component 200 may alternatively be determined based on a specific component. For example, if the first component 100 is an antenna elastic sheet and the second component is a SIM card tray, the distance between the first component 100 and the second component 200 is essentially a minimum linear distance between the antenna elastic sheet and a SIM card in the SIM card tray.

The distance L between the first component 100 and the second component 200 is a safety distance, and the distance L is also a threshold distance. It should be noted that the threshold distance is the minimum distance to prevent mutual interference between the first component and the second component. In other words, when the first component and the second component maintain at least the threshold distance, the first component and the second component can work properly and meet their design requirements and design performance. The installation board 400 is usually disposed transversely, that is, a board surface of the installation board 400 is parallel to the F1 direction. A space indicated by L in the figure is an avoidance space between the first component 100 and the second component 200, and the avoidance space is a space in the transverse direction. The transverse direction (F1 direction) is generally a length direction or a width direction of the electronic device, and the longitudinal direction (F2 direction) is generally a thickness direction of the electronic device.

As described above, in the prior-art solution, the electronic component connecting structure usually uses the space in the transverse direction as the avoidance space between the first component 100 and the second component 200. Such an electronic component connecting structure occupies a relatively large space in the transverse direction inside the electronic device, affecting miniaturization of the electronic device in the length and width directions and resulting in a relatively large profile of the electronic device.

To resolve the problem of a relatively large space occupied by an electronic component connecting structure in the prior art, the embodiments of this application provide an electronic component connecting structure and an electronic device. The electronic component connecting structure can reduce space occupied by the electronic component connecting structure in a transverse direction, thereby reducing occupation of space inside the electronic device. The following describes the embodiments of this application with reference to FIG. 4 to FIG. 8.

An embodiment of this application provides an electronic device. The electronic device 01 includes, for example, a mobile phone, a tablet computer, a personal digital assistant (personal digital assistant, PDA), a vehicle-mounted computer, and a smart wearable product. The embodiments of this application impose no special limitation on a specific form of the electronic device 01. For ease of description, the following provides description by using an example in which the electronic device 01 is a mobile phone.

Figure 4:
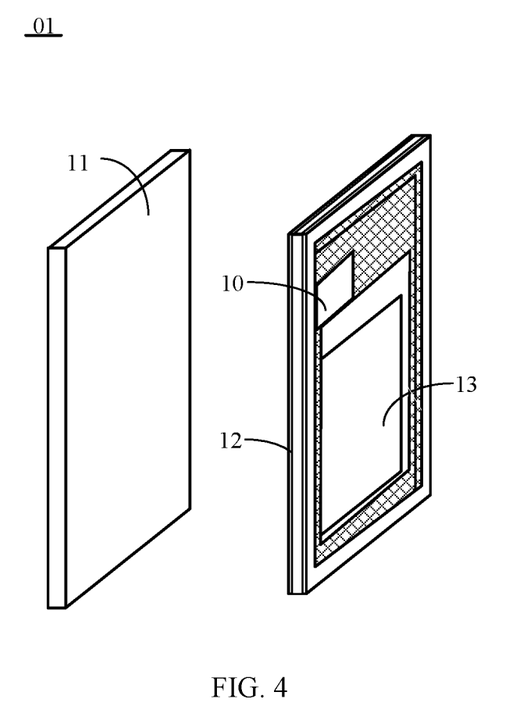
FIG. 4 is a schematic diagram of an electronic device according to an embodiment of this application.

FIG. 4 is a schematic diagram of an electronic device according to an embodiment of this application. As shown in FIG. 4, the electronic device 01 is a mobile phone, mainly including a display assembly (not shown in the figure), a housing 11, a middle frame 12, and an internal assembly 13. The display assembly is connected to one side of the middle frame 12, and the housing 11 is connected to the other side of the middle frame 12. The internal assembly 13 is disposed between the display assembly and the housing 11 and is fixedly connected to the middle frame 12 or an inner side of the housing 11. The internal assembly 13 may include a chip, a PCB board, a memory, a sensor, and the like.

The mobile phone may further include an electronic connecting structure 10 disposed inside the housing 11, and the electronic connecting structure 10 may be fixedly connected to the housing 11, or may be fixedly connected to the middle frame 12 or the internal assembly 13. The mobile phone includes various electronic components, such as an antenna elastic sheet, a subscriber identity module (Subscriber Identity Module, SIM) card tray, a microphone, a speaker, a motor, a camera, or a receiver. When these components are installed inside the mobile phone, a corresponding electronic connecting structure is usually required for connecting, and a specific avoidance space is provided.

The following describes a specific structure of the electronic connecting structure 10 by using an example in which a first component 100 is an antenna elastic sheet and a second component 200 is a SIM card tray.

Figure 5:
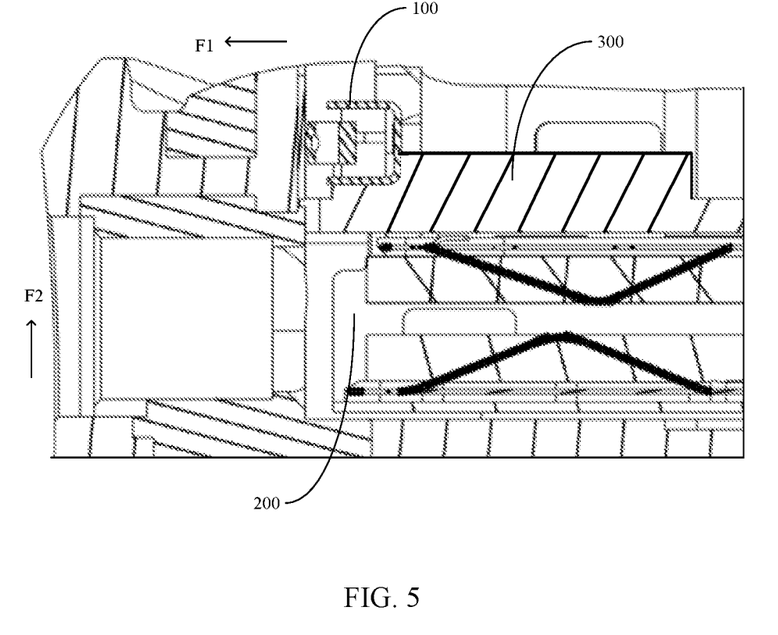
FIG. 5 is a schematic diagram of an electronic component connecting structure according to an embodiment of this application.

FIG. 5 is a schematic diagram of an electronic component connecting structure according to an embodiment of this application. As shown in FIG. 5, the connecting structure includes a connecting board 300, the first component 100, and the second component 200, where the connecting board 300 is used to connect the first component 100 and the second component 200. Specifically, the first component 100 is connected to one side of the connecting board 300, and the second component 200 is connected to the other side of the connecting board 300. The first component 100 and the second component 200 are disposed on both sides of the connecting board 300, helping make full use of spaces on both sides of the connecting board 300. A perpendicular projection of the first component 100 on a preset plane and a perpendicular projection of the second component 200 on the preset plane have a distance less than L or overlap each other.

The distance between the perpendicular projection of the first component 100 on the preset plane and the perpendicular projection of the second component 200 on the preset plane may be a minimum linear distance between the two projections when the perpendicular projection of the first component 100 itself on the preset plane does not overlap the perpendicular projection of the second component 200 itself on the preset plane; or certainly, may be a minimum linear distance between the two projections when a perpendicular projection of an interfering source of the first component 100 on the preset plane does not overlap a perpendicular projection of an interfering source of the second component 200 on the preset plane. For example, the distance between the perpendicular projection of the first component 100 on the preset plane and the perpendicular projection of the second component 200 on the preset plane may be zero.

For example, when the first component 100 is an antenna elastic sheet and the second component is a SIM card tray, the interfering source of the antenna elastic sheet is the antenna elastic sheet itself, and the interfering source of the SIM card tray is a SIM card in the SIM card tray. Therefore, the distance between the perpendicular projection of the first component 100 on the preset plane and the perpendicular projection of the second component 200 on the preset plane is essentially a minimum linear distance between the two projections when a perpendicular projection of the antenna elastic sheet on the preset plane does not overlap a perpendicular projection of the SIM card in the SIM card tray on the preset plane.

The following describes the embodiments of this application by using a case in which the perpendicular projection of the first component 100 on the preset plane overlaps the perpendicular projection of the second component 200 on the preset plane.

It should be noted that the preset plane in this application is a plane parallel to a plane on which one side of the connecting board 300 is located. With reference to FIG. 5, when the connecting board 300 is being disposed, planes on which both sides of the connecting board 300 are located are parallel to the F1 direction and perpendicular to the F2 direction. It can be learned from the above description that the preset plane is perpendicular to the F2 direction. However, in actual production and processing, the above requirement may not be fully met due to errors or other reasons.

In the embodiments of this application, the perpendicular projection of the first component 100 on the preset plane is a first projection, and the perpendicular projection of the second component 200 on the preset plane is a second projection, where the first projection overlaps the second projection. The overlap in the embodiments of this application includes partial overlap and complete overlap. Complete overlap of the first projection and the second projection means that shapes of the first projection and the second projection are exactly the same and coincide on the preset plane. However, because it is difficult for the shapes of the first projection and the second projection to be completely consistent, it is rare that the first projection completely overlaps the second projection.

Partial overlap of the first projection and the second projection includes the following cases: if the first projection completely falls within the second projection, an overlap part of the first projection and the second projection is equal to the first projection in size; if the second projection completely falls within the first projection, the overlap part of the first projection and the second projection is equal to the second projection in size; and if the first projection does not fall within the second projection, neither does the second projection fall within the first projection, the first projection and the second projection partially overlap, and an area of an overlap part is smaller than an area of the first projection and an area of the second projection.

In the embodiments of this application, the first projection and the second projection coincide, which can increase a coincidence degree of the first component 100 and the second component 200 in the direction perpendicular to the preset plane, that is, increase a coincidence degree of the first component 100 and the second component 200 in the longitudinal direction (F2 direction), thereby reducing space occupied in the transverse direction. A transverse space in an electronic device is mainly determined by a length and a width. Reducing the occupation of transverse space helps reduce the length and the width of the electronic device.

In the embodiments of this application, the distance between the first component 100 and the second component 200 is greater than or equal to the threshold distance. When a connecting line between the first component 100 and the second component 200 is horizontal, the distance between the first component 100 and the second component 200 is a transverse distance, and a longitudinal distance between them is zero; when the connecting line between the first component 100 and the second component 200 is vertical, the distance between the first component 100 and the second component 200 is a longitudinal distance, and the transverse distance between them is zero; when the connecting line between the first component 100 and the second component 200 is neither horizontal nor vertical, the distance between the first component 100 and the second component 200 is an oblique distance, and neither the transverse distance nor the longitudinal distance between the first component 100 and the second component 200 is zero.

The distance between the first component 100 and the second component 200 may be a distance between two closest solder pins between solder pins of the first component 100 and solder pins of the second component 200; or may be a distance between two closest solder pins between solder pins of the first component 100 on the connecting board 300 and solder pins of the second component 200 on the connecting board 300; or may be a distance between two closest metal parts between metal parts of the first component and metal parts of the second component.

The distance between the first component 100 and the second component 200 is not less than the threshold distance, so that a sufficient avoidance space is reserved for the first component 100 and the second component 200, to prevent mutual interference between the first component 100 and the second component 200, or make the interference between the first component and the second component acceptable and within a controllable range. For example, when the first component is an antenna elastic sheet and the second component is a SIM card tray, the distance between them is greater than or equal to the threshold distance, so that the SIM card tray does not affect antenna performance and the antenna elastic sheet does not affect data transmission of the SIM card tray. The threshold distance may be the distance L shown in FIG. 1.

It should be noted that the connecting board 300 in this embodiment of this application is generally a circuit board, for example, a PCB board, that the first component 100 is connected to the connecting board 300 means that a circuit inside the first component 100 communicates with a circuit in the connecting board 300, and the first component 100 is fixedly connected to the connecting board 300. A connecting point between the first component 100 and the connecting board 300 is referred to as a first connecting pin, and there are generally a plurality of connecting points between the first component 100 and the connecting board 300. Therefore, there may be a plurality of connecting pins between the first component 100 and the connecting board 300. A circuit in the connecting board 300 that communicates with the first component 100 is referred to as a first circuit. That the second component 200 is connected to the connecting board 300 means that a circuit inside the second component 200 communicates with a circuit in the connecting board 300, and the second component 200 is fixedly connected to the connecting board 300. A connecting point between the second component 200 and the connecting board 300 is referred to as a second connecting pin, and there may be a plurality of connecting points between the second component 200 and the connecting board 300. Therefore, there may be a plurality of connecting pins between the second component 200 and the connecting board 300. A circuit in the connecting board 300 that communicates with the second component 200 is referred to as a second circuit. Preventing the mutual interference between the first component 100 and the second component 200 includes: preventing a contact between the first connecting pin and the second connecting pin from causing short circuit, signal crosstalk, or other effects; and preventing interference between the first circuit and the second circuit. The foregoing fixed connection may be connection through welding, which can ensure connection rigidity between the first component 100 and the second component 200 and the connecting board 300, and also allows the first component 100 and the second component 200 to be electrically connected to the connecting board 300 easily.

Figure 6:
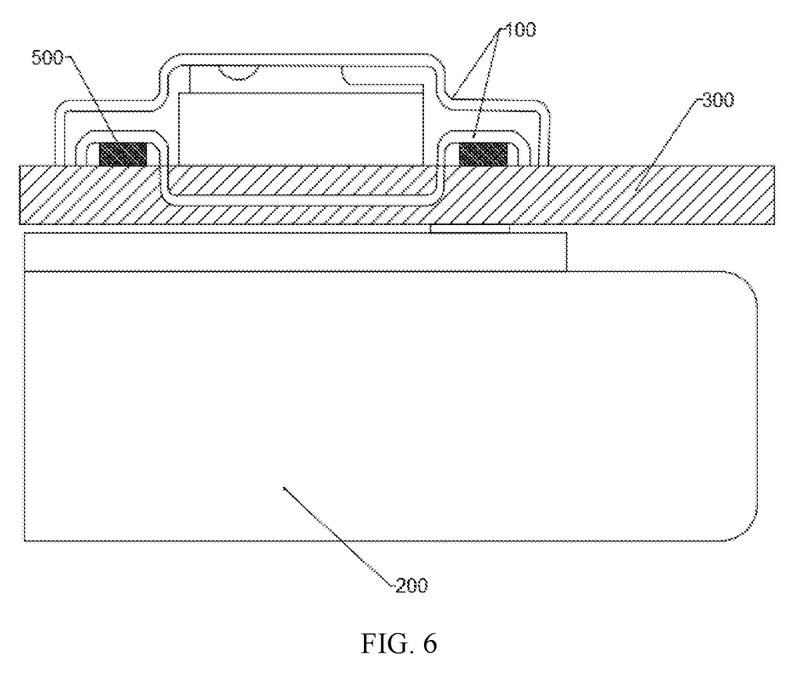
FIG. 6 is a schematic diagram of another electronic component connecting structure according to an embodiment of this application.

FIG. 6 is a schematic diagram of another electronic component connecting structure according to an embodiment of this application. As shown in FIG. 6, in an embodiment of this application, to prevent the mutual interference between the first component 100 and the second component 200, a padding element 500 is disposed between the first component 100 and the connecting board 300. One end of the padding element 500 is fastened on the connecting board 300, and the other end is in contact with the first component 100 to pad the first component 100 to increase a distance between the first component 100 and the second component 200, so that the distance between the first component 100 and the second component 200 is not less than the threshold distance L.

In this embodiment of this application, the padding element 500 may be an electronic component connected to the connecting board 300, or may be a specially disposed pad, for example, a plastic pad. Preferably, the padding element 500 is an electronic component connected to the connecting board 300. For example, the padding element 500 may be a component such as a capacitor or a resistor. Using the component such as the capacitor and the resistor as the padding element 500 can raise the first component 100. In addition, the capacitor and the resistor can play their roles as part of the components on the connecting board 300 without adding extra costs. The padding element may alternatively not implement a function of electrical connection. Even if a pad is used for padding, the cost of the pad is lower than that of a circuit board, thereby reducing the cost of the entire electronic component connecting structure while ensuring the distance between the first component 100 and the second component 200.

The padding element 500 may be connected to the connecting board 300 through welding, and stable connection between the padding element 500 and the connecting board can be achieved through welding. When the padding element 500 is a capacitor, a resistor, or another electronic component, the capacitor or the resistor may be connected to the connecting board 300 by using the dual in-line package (Dual In-line Package, DIP) technology. As shown in FIG. 5, in an embodiment of this application, the connecting board 300 may be an integral body, but the connecting board 300 is a plate with an unequal thickness. Specifically, a protrusion is disposed on one side of the connecting board 300. The first component 100 is connected to the protrusion on one side of the connecting board 300, the second component 200 is connected to the other side of the connecting board 300, and the first component 100 and the second component 200 are connected to both sides of the connecting board 300, respectively.

In this embodiment of this application, a thickness of a partial region on the connecting board 300 is increased by disposing the protrusion. The first component 100 is disposed on the protrusion of the connecting board 300, and the second component 200 is disposed on the other side of the connecting board 300. The connecting board 300 and the protrusion on the connecting board 300 serve to isolate the first component 100 from the second component 200. The distance between the first component 100 and the second component 200 can be adjusted by setting a thickness of the protrusion, so that a safe avoidance distance (namely, a threshold distance) is maintained between the first component 100 and the second component 200, thereby preventing the mutual interference between the first component 100 and the second component 200.

Alternatively, in this embodiment of this application, a protrusion may be disposed on each side of the connecting board 300, and the first component 100 and the second component 200 may be respectively connected to the protrusions on both sides. The distance between the first component 100 and the second component 200 may be adjusted by adjusting a height of the protrusion on one side or heights of the protrusions on both sides, so that the distance is not less than the threshold distance, thereby avoiding the mutual interference between the first component 100 and the second component 200.

Figure 7:
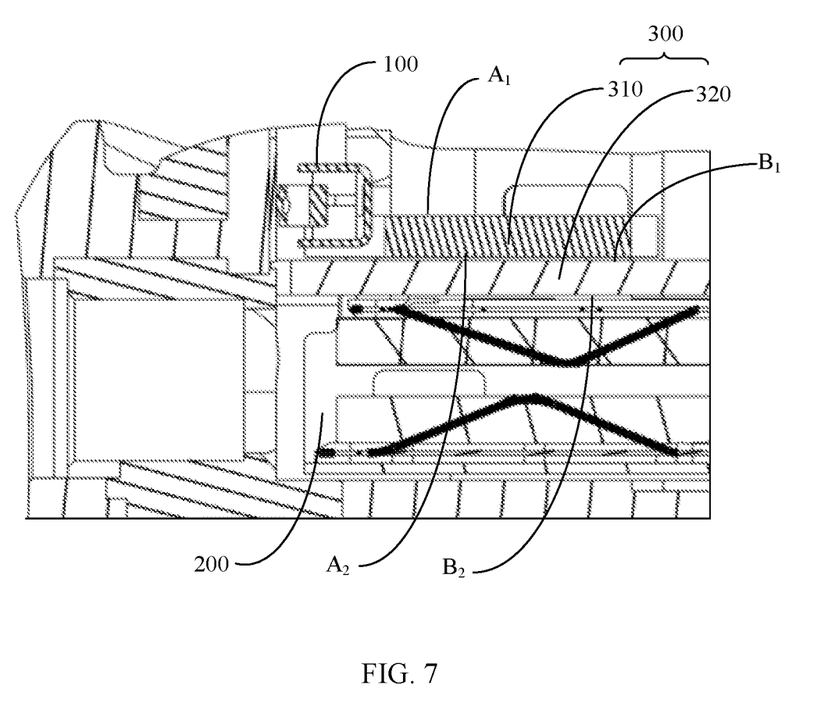
FIG. 7 is a schematic diagram of still another electronic component connecting structure according to an embodiment of this application.
Figure 8:
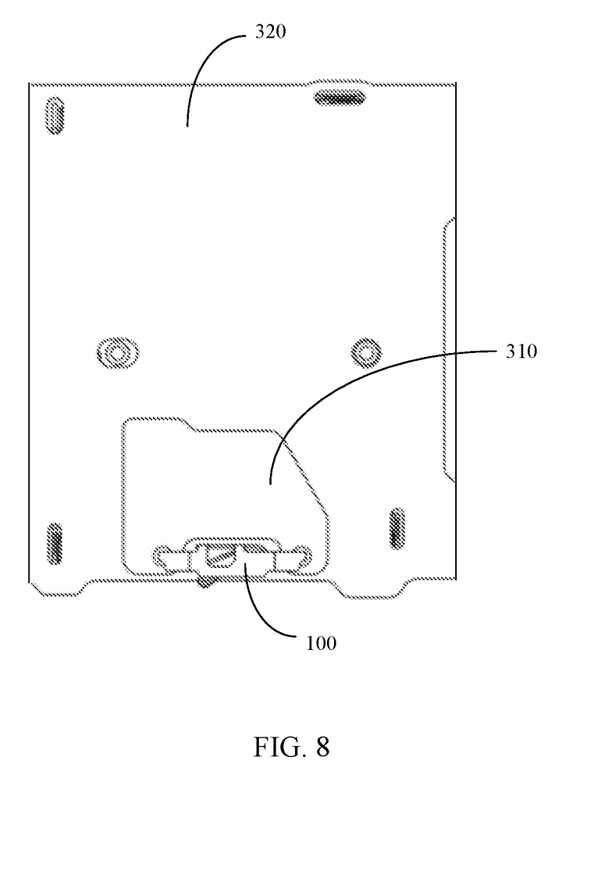
FIG. 8 is a top view of an electronic component connecting structure according to an embodiment of this application.

In an embodiment of this application, the connecting board 300 may be a composite structure. For example, the connecting board 300 is a structure formed by a plurality of connecting sub-boards 300. FIG. 7 is a schematic diagram of still another electronic component connecting structure according to an embodiment of this application. FIG. 8 is a top view of an electronic component connecting structure according to an embodiment of this application.

As shown in FIG. 7 and FIG. 8, the connecting board 300 includes a first connecting sub-board 310 and a second connecting sub-board 320, where the first connecting sub-board 310 includes a first side $A_1$ and a second side $A_2$, and $A_1$ and $A_2$ are opposite each other; and the second connecting sub-board 320 includes a first side $B_1$ and a second side $B_2$, and $B_1$ and $B_2$ are opposite each other. The first component 100 is connected to the first side $A_1$ of the first connecting sub-board 310, and the second component 200 is connected to the second side $B_2$ of the second connecting sub-board 320. The second side $A_2$ of the first connecting sub-board 310 is connected to the first side $B_1$ of the second connecting sub-board 320, and the first connecting sub-board 310 has a smaller area than the second connecting sub-board 320. The second connecting sub-board 320 may be fastened in a housing of an electronic device or fastened on a supporting member inside the electronic device.

The second side $A_2$ of the first connecting sub-board 310 is connected to the first side $B_1$ of the second connecting sub-board 320, so that the first component 100 located on the first side $A_1$ of the first connecting sub-board 310 and the second component 200 located on the second side $B_2$ of the second connecting sub-board 320 are respectively located on both sides of the connecting sub-board 300, allowing spaces on both sides of the connecting sub-board 300 to be fully used. Two connecting sub-boards 300 form the connecting board 300, and the first component 100 and the second component 200 are respectively located on both sides of the connecting board 300, meaning that the first component 100 and the second component 200 are spaced apart by the first connecting sub-board 310 and the second connecting sub-board 320. The first connecting sub-board 310 is stacked with the second connecting sub-board 320, and a position at which the sub-boards are stacked can increase a thickness of the connecting board 300, which helps increase the distance between the first component 100 and the second component 200 to meet the threshold distance. The increased thickness of the connecting board 300 facilitates position arrangement of a first connecting pin and a second connecting pin to prevent a contact between the first connecting pin and the second connecting pin, and also facilitates wiring of a first circuit and a second circuit to prevent mutual interference between the first circuit connected to the first component 100 and the second circuit connected to the second component 200.

Figure 9:
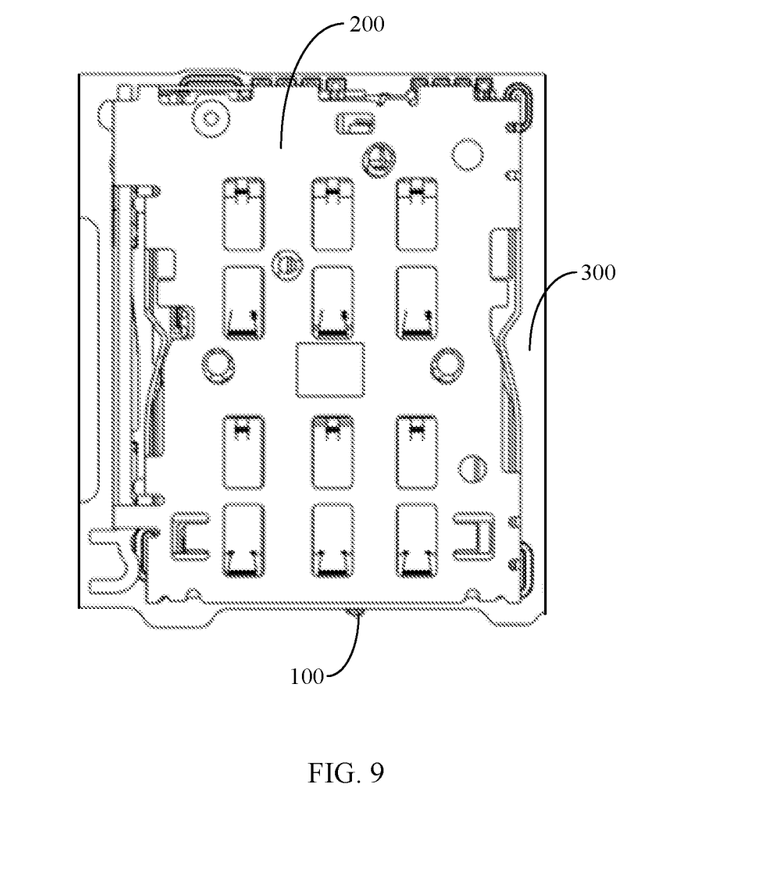
FIG. 9 is a bottom view of an electronic component connecting structure according to an embodiment of this application.

FIG. 9 is a bottom view of an electronic component connecting structure. It can be seen from FIG. 9 that the first component 100 overlaps the second component 200 when viewed from the bottom (in the F2 direction).

As shown in FIG. 8 and FIG. 9, the first component 100 and the second component 200 are respectively located on both sides of the connecting board 300, and a first projection of the first component 100 on a preset plane overlaps a second projection of the second component 200 on the preset plane, so that when being disposed, the first component 100 and the second component 200 mainly occupy a longitudinal space in the electronic device, and such placement can reduce transverse space occupied by the first component 100 and the second component 200 in the electronic device.

In an embodiment of this application, the first component 100 may be connected to a surface of the first connecting sub-board 310 or may be connected to an inside of the first connecting sub-board 310. For example, the first component 100 may be connected to the first connecting sub-board 310 by using a dual in-line package (dual in-line package, dip) technology. Such connecting manner can enhance connection rigidity between the first component 100 and the first connecting sub-board 310. In addition, the first component 100 may be alternatively connected to the first connecting sub-board 310 in a form of a dip-type component. When the first component 100 is partially or completely dipped inside the first connecting sub-board 310, a distance between the first component 100 and the second connecting sub-board 320 in a direction perpendicular to the preset plane is greater than or equal to a preset distance. The preset distance is a distance for safe processing, and is mainly used to realize a process for connecting the first component 100 and the first connecting sub-board 310 and avoid mutual interference between the first component 100 and the second connecting sub-board 320. When the first component 100 is a dip-type component, for a specific installation manner, refer to the manners shown in FIG. 2 and FIG. 3.

The first side $B_1$ of the second connecting sub-board 320 is connected to the second side $A_2$ of the first connecting sub-board 310, and the second connecting sub-board 320 may usually be connected to the first connecting sub-board 310 through gluing or welding. Therefore, the first side $B_1$ of the second connecting sub-board 320 is basically attached to the second side $A_2$ of the first connecting sub-board 310. The distance between the first component 100 and the second connecting sub-board 320 in the direction perpendicular to the preset plane may be understood as a distance between the first component 100 and the second side $A_2$ of the first connecting sub-board 310. To be specific, if the first component 100 is partially or completely dipped inside the first connecting sub-board 310, the first component 100 needs to maintain at least a preset distance from the other side of the first connecting sub-board 310 to prevent the first component 100 from coming into contact with the second connecting sub-board 320. In addition, when the first component 100 is connected to the first connecting sub-board 310, this distance may be used as a space for processing, to ensure a good connection effect of the first component 100 and the first connecting sub-board 310. In addition, the first component 100 maintains at least a specific preset distance from the other side of the first connecting sub-board 310, and this space can play a role of avoiding a circuit or a connecting pin on the second connecting sub-board 320.

In an embodiment of this application, a thickness of the first connecting sub-board 310 is 0.4 mm to 1.0 mm, and a thickness of the second connecting sub-board 320 is 0.4 mm to 1.0 mm. In the current electronic device, a thickness of the first connecting sub-board 310 is generally set to 0.5 mm to 0.8 mm, and a thickness of the second connecting sub-board 320 is also generally set to 0.5 mm to 0.8 mm. In this embodiment of this application, a thickness of the first connecting sub-board 310 may be set to 0.6 mm, and a thickness of the second connecting sub-board 320 may also be set to 0.5 mm. When the first connecting sub-board 310 and/or the second connecting sub-board 320 needs to be set thicker, the thickness of the first connecting sub-board 310 may be set to about 1.0 mm or may be set to be greater than 1.0 mm based on an actual situation; and the thickness of the second connecting sub-board 320 may be set to about 1.0 mm or may be set to be greater than 1.0 mm based on an actual situation. In addition, the first connecting sub-board 310 and the second connecting sub-board 320 may alternatively be set to be less than 0.3 mm in thickness. In this case, the first connecting sub-board 310 and the second connecting sub-board 320 are generally made of flexible boards. Certainly, this embodiment of this application does not limit specific thicknesses of the first connecting sub-board 310 and the second connecting sub-board 320. In actual production and processing, the thicknesses of the first connecting sub-board 310 and the second connecting sub-board 320 may be set based on actual requirements.

In another embodiment of this application, the perpendicular projection of the first component 100 on the preset plane does not overlap the perpendicular projection of the second component 200 on the preset plane, and the distance between the first component 100 and the second component 200 is greater than or equal to the threshold distance. To be specific, when the connecting line between the first component 100 and the second component 200 is neither horizontal nor vertical, the distance between the first component 100 and the second component 200 is an oblique distance. In this case, there is a specific transverse distance and a specific longitudinal distance between the first component 100 and the second component 200, but the transverse distance is less than the threshold distance and the longitudinal distance may be less than the threshold distance.

In this embodiment, part of the transverse space and part of the longitudinal space jointly form an avoidance space between the first component 100 and the second component 200, so that the distance between the first component 100 and the second component 200 is not less than the threshold distance. This manner effectively reduces the transverse space occupied by the first component 100 and the second component 200, compared with a manner in which only the transverse space is used as the avoidance space between the first component 100 and the second component 200, thereby reducing the occupation of transverse space inside the electronic device and helping make a profile of the electronic device smaller.

The foregoing descriptions are only specific implementations of this application, but are not intended to limit the protection scope of this application. Any variation or replacement readily figured out by a person skilled in the art within the technical scope disclosed in this application shall fall within the protection scope of this application.

All embodiments in this specification are described in a progressive manner. Each embodiment focuses on differences from other embodiments. For the part that is the same or similar between different embodiments, reference may be made between the embodiments.

Although some preferred embodiments of the embodiments of this application have been described, a person skilled in the art can make changes and modifications to these embodiments once they learn the basic inventive concept. Therefore, the protection scope of this application covers the preferred embodiments and all changes and modifications falling within the scope of the embodiments of this application.

The foregoing descriptions about the embodiments are merely provided to help understand the method and the core idea of this application. In addition, a person of ordinary skill in the art can make changes to the specific implementations and the application scope according to the idea of this application. Therefore, the content of this specification shall not be construed as a limitation on this application.

What is claimed is:

1. A connecting structure, comprising:
   a connecting board;
   a first component which is an antenna elastic sheet, connecting to one side of the connecting board; and
   a second component which is a subscriber identity module (SIM) card tray, connecting to the other side of the connecting board;
   wherein a perpendicular projection of the first component on a preset plane overlaps a perpendicular projection of the second component on a preset plane, and the preset plane is parallel to a plane on which one side of the connecting board is located; and
   wherein a padding element is disposed between the first component and the connecting board.

2. The connecting structure according to claim 1, wherein, in a thickness direction, one end of the padding element is fastened on the connecting board, and the another end of the padding element is connected to the first component.

3. The connecting structure according to claim 1, wherein the connecting board comprises a first connecting sub-board and a second connecting sub-board; wherein the first component is connected to a first side of the first connecting sub-board, and the second component is connected to a second side of the second connecting sub-board;
   wherein a second side of the first connecting sub-board is connected to a first side of the second connecting sub-board, and the first connecting sub-board has a smaller area than the second connecting sub-board; and
   wherein the first side of the first connecting sub-board is opposite the second side of the first connecting sub-board, and the first side of the second connecting sub-board is opposite the second side of the second connecting sub-board.

4. The connecting structure according to claim 1, wherein the padding element comprises a first protrusion provided on one side of the connecting board, wherein the first component is connected to the first protrusion.

5. The connecting structure according to claim 1, wherein the padding element is welded to the connecting board.

6. The connecting structure according to claim 1, wherein the first component and the connecting board are packaged using dual in-line package (DIP).

7. The connecting structure according to claim 1, wherein the padding element is a capacitor, a resistor, or a pad.

8. The connecting structure according to claim 3, wherein the first connecting sub-board is welded to the second connecting sub-board.

9. The connecting structure according to claim 3, wherein a thickness of the first connecting sub-board is 0.4 mm to 1.0 mm, and a thickness of the second connecting sub-board is 0.4 mm to 1.0 mm.

10. The connecting structure according to claim 1, wherein the connecting board is a printed circuit board (PCB) board.

11. The connecting structure according to claim 1, wherein the padding element comprises a second protrusion provided on the other side of the connecting board, wherein the second component is connected to the second protrusion.

12. An electronic device, comprising:
    a housing; and
    a connecting structure;
    wherein the connecting structure comprises:
    a connecting board;
    a first component connecting to one side of the connecting board; and
    a second component connecting to the other side of the connecting board;
    wherein a perpendicular projection of the first component on a preset plane overlaps a perpendicular projection of the second component on a preset plane, and the preset plane is parallel to a plane on which one side of the connecting board is located;

wherein a padding element which comprises a capacitor, a resistor, or a pad, is disposed between the first component and the connecting board; and wherein the connecting structure is connected to the housing.

13. The electronic device according to claim 12, wherein, in a thickness direction, one end of the padding element is fastened on the connecting board, and another end of the padding element is connected to the first component.

14. The electronic device according to claim 12, wherein the connecting board comprises a first connecting sub-board and a second connecting sub-board; wherein the first component is connected to a first side of the first connecting sub-board, and the second component is connected to a second side of the second connecting sub-board;

wherein a second side of the first connecting sub-board is connected to a first side of the second connecting sub-board, and the first connecting sub-board has a smaller area than the second connecting sub-board; and wherein the first side of the first connecting sub-board is opposite the second side of the first connecting sub-board, and the first side of the second connecting sub-board is opposite the second side of the second connecting sub-board.

15. The electronic device according to claim 12, wherein the padding element comprises a first protrusion provided on one side of the connecting board, wherein the first component is connected to the first protrusion.

16. The electronic device according to claim 12, wherein the padding element is welded to the connecting board.

17. The electronic device according to claim 12, wherein the first component and the connecting board are packaged using dual in-line package (DIP).

18. The electronic device according to claim 14, wherein the first connecting sub-board is welded to the second connecting sub-board.

19. The connecting structure according to claim 12, wherein the first component is an antenna elastic sheet, the second component is a subscriber identity module (SIM) card tray, and the connecting board is a printed circuit board (PCB) board.

20. A connecting structure, comprising:

a connecting board comprising a first connecting sub-board and a second connecting sub-board;

a first component, connecting to one side of the connecting board, including connecting to a first side of the first connecting sub-board; and a second component, connecting to the other side of the connecting board, including connecting to a second side of the second connecting sub-board, wherein a second side of the first connecting sub-board is connected to a first side of the second connecting sub-board, and the first connecting sub-board has a smaller area than the second connecting sub-board, and wherein the first side of the first connecting sub-board is opposite the second side of the first connecting sub-board, and the first side of the second connecting sub-board is opposite the second side of the second connecting sub-board;

wherein a perpendicular projection of the first component on a preset plane overlaps a perpendicular projection of the second component on a preset plane, and the preset plane is parallel to a plane on which one side of the connecting board is located; and wherein a padding element is disposed between the first component and the connecting board.

* * * * *